Patented Aug. 5, 1924.

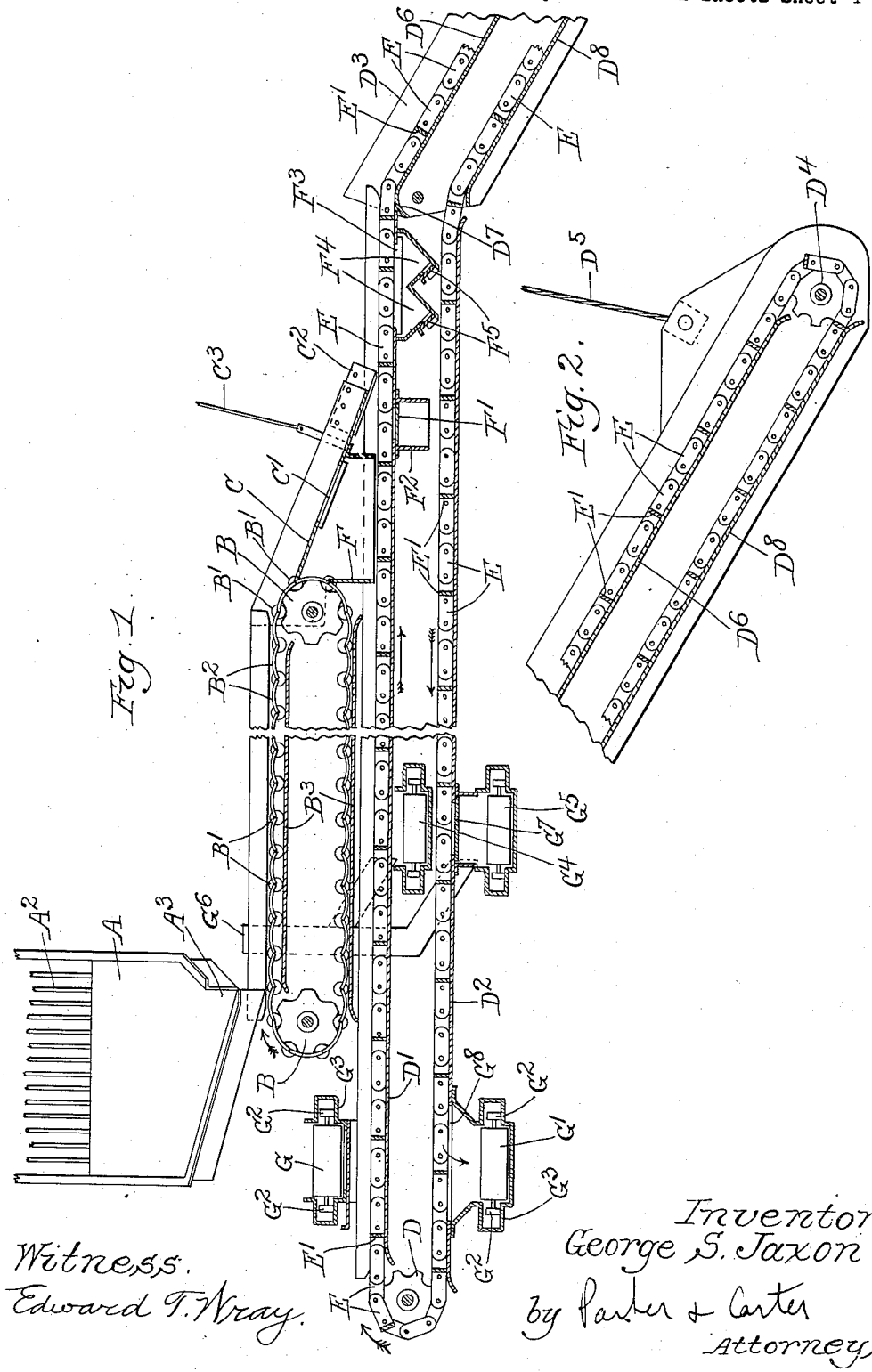

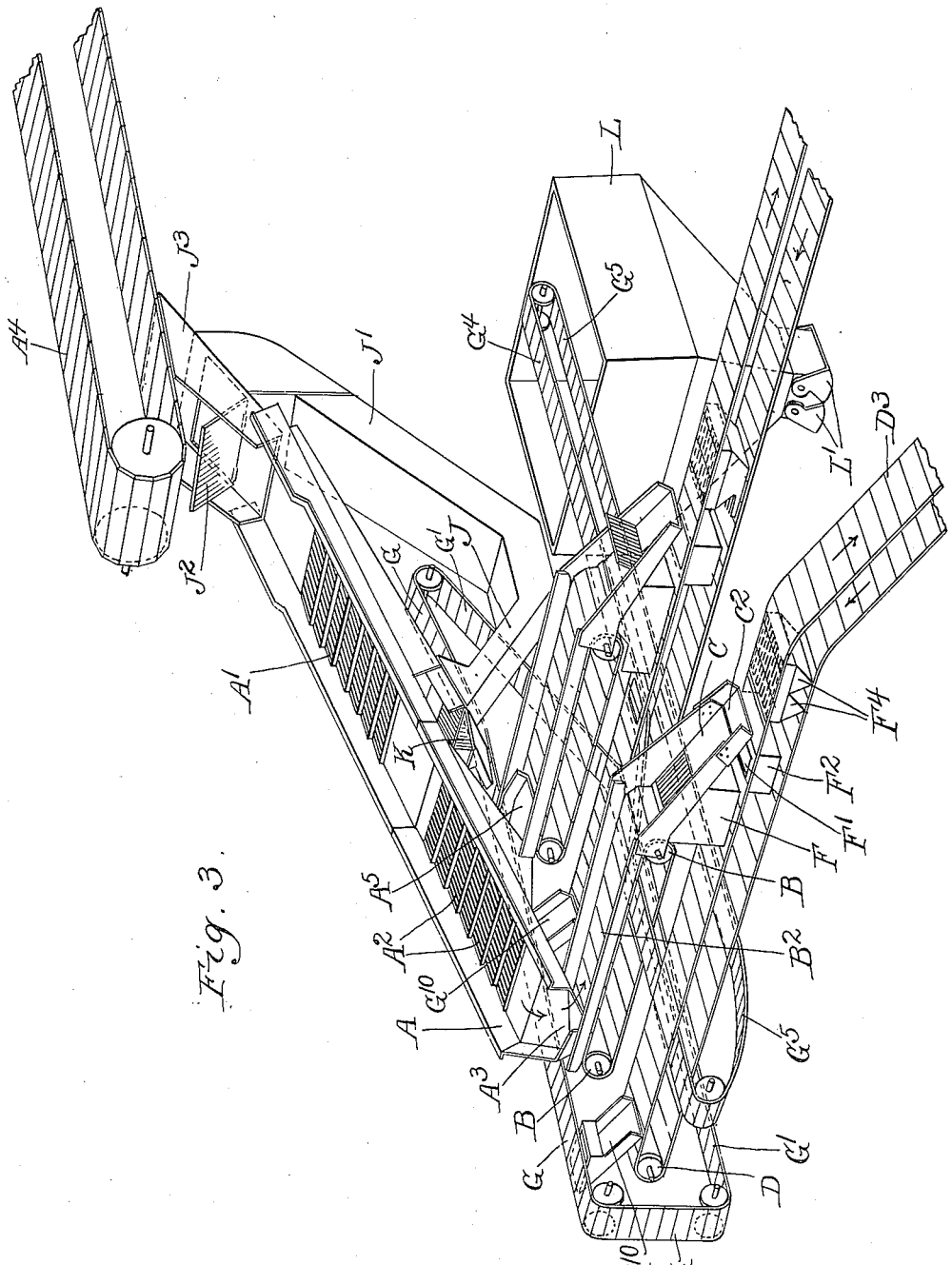

1,503,954

UNITED STATES PATENT OFFICE.

GEORGE S. JAXON, OF HUNTINGTON, WEST VIRGINIA, ASSIGNOR TO LINK BELT COMPANY, OF CHICAGO, ILLINOIS, A CORPORATION OF ILLINOIS.

COAL-SCREENING APPARATUS.

Application filed September 16, 1922. Serial No. 588,520.

*To all whom it may concern:*

Be it known that I, GEORGE S. JAXON, a citizen of the United States, residing at Huntington, in the county of Cabell and State of West Virginia, have invented a certain new and useful Improvement in Coal-Screening Apparatus, of which the following is a specification.

My invention relates to an improvement in conveyors, and particularly to a conveying arrangement whereby coal or similar materials may be conveyed for storage or shipment with a minimum shock or breakage, in connection with an efficient rescreening apparatus. The invention particularly relates to a combination of conveyors adapted automatically to control the rescreening of sized coal in the course of loading it into railroad cars, or any other receptacles, by means of loading booms or other loading machinery. Other objects will appear from time to time in the course of the specification and claims.

I illustrate my invention more or less diagrammatically in the accompanying drawings, wherein—

Fig. 1 is a longitudinal section through my loading and rescreening device;

Fig. 2 is a section continuing the device shown in Fig. 1;

Fig. 3 is a perspective of the entire screening and loading installation.

Like parts are indicated by like characters throughout the drawings.

A is any suitable screen or conveyor having the screening elements $A^1$, $A^2$ and the delivery spout $A^3$. The details of this screen or conveyor do not form part of the present invention and any suitable material delivery means might be used, for example, the endless conveyor $A^4$.

Mounted beneath the spout $A^3$ is an endless conveyor or picking table comprising the terminal sprockets B, the sprocket engaging rollers $B^1$, connected arched conveying plates $B^2$, and the tracks or supporting plates $B^3$ upon which the picking conveyor rides. Any suitable means, not herein shown, are provided for supporting the operatives engaged in the picking operation.

Pivoted adjacent the outer sprocket B, at the delivery end of the conveyor, is the inclined chute C, having therein a rescreening element $C^1$. The outer end of the chute is provided with a telescopic adjustable end section $C^2$, and $C^3$ is any suitable supporting means for adjusting the height of the outer end of the chute to allow for its adjustment for length. It will be understood that any suitable additional supporting means may be used for holding the outer end of the chute at a slight distance above the endless conveyor below described.

Positioned beneath the picking conveyor is a second endless conveyor comprising in part the terminal sprocket D, the plates $D^1$ and $D^2$, upon which ride respectively the upper and lower strands of the conveyor chain, and the pivoted loading boom section $D^3$, having at its end the sprocket $D^4$ and being adjustably supported at its outer end by any suitable means $D^5$. The loading boom is provided with an upper conveying plate $D^6$ having an arcuate section $D^7$ adapted to maintain a constant practical contact with the upper plate $D^1$ of the horizontal section of the conveyor. The lower strand of the chain may be supported by any suitable plate or track $D^8$.

The details of the chain are not of particular importance, but it comprises the laterally disposed links E and cross flights $E^1$, adapted to convey material by scraping it along the supporting or conveying plates.

Positioned beneath the screen $C^1$ in the pivoted trough C is a box or large spout F adapted to drop the fines delivered through the screen directly upon the plate $D^1$. $F^1$ is a gate in a plate $D^1$ between the spout F and the outer end of the chute C. It is removably mounted in the delivery spout $F^2$, which is adapted to deliver material from the plate $D^1$ to the plate $D^2$. $F^3$ is any suitable screen or bar arrangement intermediate the end of the chute C and the pivot point of the loading boom. Beneath it lie one or more material-receiving pockets $F^4$, in which are mounted gates $F^5$ which may be opened to permit delivery of material to the lower plate $D^2$.

G is a diagrammatic representation of any suitable conveyor adapted to deliver material to the plate $D^1$ at the end opposite the loading boom, for example, by the chute $G^{10}$. It is herein illustrated as an endless conveyor with a lower strand $G^1$ and supporting rollers $G^2$ and a track $G^3$, but obviously any form of conveyor might be used. A similar form of conveyor is illustrated having an upper strand $G^4$ passing between the two plates $D^1$ and $D^2$ and the lower strand $G^5$ beneath the plate $D^2$. If desired, refuse conveyors or chutes $G^6$ may be provided adjacent the picking conveyor, and adapted to deliver material to $G^4$ or $G^5$. The plate $D^2$ is broken away, as at $G^8$, above the conveyor $G^1$, in order to permit delivery of material thereto, and it may also be provided with a removable gate or valve $G^7$ above the conveyor $G^5$.

In Figure 3 I illustrate a complete loading and screening assembly, in which two of the endless conveyor picking tables, earlier described, are associated with the screen A, one receiving the lump which passes over the screen and is delivered by the spout $A^3$, and the other receiving the screenings, for example, egg, which passes through the screening element $A^2$ and is delivered by the spout $A^5$.

The screenings from the upper screening section $A^1$ may be delivered to the slack chute J, which joins the run of mine chute $J^1$ which is supplied through the valve $J^2$ in the chute $J^3$ between the screen A and the conveyor $A^4$. The slack and the run of mine may subsequently be loaded directly on cars, or may be conveyed away for storage, by any suitable means not herein shown in detail.

K is a chute adapted to deliver screenings from the section $A^1$ to the conveyor G, whence it may be delivered by the chute $G^{10}$ to the plate $D^1$.

L is a refuse bin into which material may be discharged by the conveyor $G^4$, $G^5$, and is provided with the delivery gate $L^1$.

It will be realized that while I have illustrated a working mechanism many changes might be made in the number, size, shape and disposition of parts, and that my description and drawings are to be taken as in a broad sense diagrammatic; in particular, the details of the conveyors, and the spacing, proportion and relation thereof, may be widely varied without departing from the spirit of my invention.

The use and operation of my invention are as follows:

I illustrate any suitable means for delivering coal, screened or unscreened, to the upper or picking conveyor. Preferably I employ screens or conveyors which deliver or may deliver lump coal to the picking table. The upper conveyor or picker conveys the coal past the picking operators, who remove the refuse in the usual manner and dispose of it in any suitable way. The picked coal then passes over the chute C and the rescreening bars $C^1$. The fines drop through the bars to the top plate $D^1$ of the conveyor and are carried therealong by the chain flights in the direction shown by the arrow in Fig. 1. The fines may, if desired, be permitted to drop through the chute $F^2$ of the gate $F^1$, in which case they are carried in an opposite direction by the lower strands of the conveyor along the lower plate and may be delivered to the conveyor $G^5$ or the conveyor $G^1$, or may be removed and disposed of in any other suitable manner. The pivoted chute C is adjustable as to length and angle, and the outer end is always spaced above the chain flights sufficiently to permit coal of small or medium size to pass thereunder. Beyond the end of the chute is a second rescreening member, beneath which are coal pockets into which the fines or rescreenings fall. The bottoms of these pockets may be opened to permit delivery to the lower plate, as above described in connection with the first screen. If the gates are closed, however, the pockets soon fill up and then the large coal passes on down the loading boom without such separation. In that case the rescreening pockets, filled with fine coal, form a solid trough direct to the car, to which the coal is delivered.

The conveyor G which is shown as single, but may be made multiple, may be employed to deliver to the opposite end of the conveyor coal of any suitable size—for example, of a grade intermediate between the fines and the lump. Nut and slack may be delivered to the conveyor thereby, and will then pass along the upper plate beneath the rescreening device, the fines being first deposited thereupon through the screen $C^1$, and the lump coal being deposited on top of the mixture by the chute C. In such case, the gate $F^1$ may be closed and the entire mixture delivered with the fines at the bottom, and the lump at the top is conveyed down to the loading boom horizontally graded, and is delivered in that condition to the car or other receptacle.

It will thus be observed that the mechanism herein shown is particularly well adapted to prevent breakage of the coal, since the delivery is over endless conveyors and down a low angle chute. Furthermore, if desired, the fines may be removed with peculiar efficiency and completeness. If mixed coal is desired, the mixture may be delivered graded in horizontal layers, with the heavy coal at the top to prevent the dispersal of the fines by wind or otherwise.

The rescreening process is entirely automatic, and the single conveyor simultaneously delivers the screened coal in one direction and the screenings in other and opposite direction.

An installation is illustrated in Figure 3 showing two of the picking units, although a single one might be used or a greater number. The material to be screened and loaded, for example, run of the mine coal, is delivered by the conveyor A⁴ by the spout J³ to the screen A. It may be delivered directly to the car or for storage through the valve J² in the spout. I illustrate a screen with two screen areas, the screenings from the first of which are shown as being delivered to the slack chute J, although obviously a third picking unit. The second screening unit I illustrate as delivering its screenings to one picking conveyor, in which the screenings in this case are, for example, egg. The lump passes over the end of the screen to another picking conveyor. The pivoted booms to which the material is delivered from the picking area are preferably lined along tracks on which coal cars may be spotted and material passes down from the picking conveyor and to the boom as earlier herein described. The rescreenings from the various picking units may be delivered to the conveyor G⁴ and may be carried thereby to the bin L. Material may also be carried from unit to unit by means of the conveyor G, the details of this connection being fully shown in Figure 1 and being earlier described.

To sum up, I illustrate an installation in which various grades of material may be first screened and then delivered to picking conveyors where the refuse may be removed, the material passing thence over rescreening units and finally to loading booms. The screenings from one picking installation may be carried to a refuse bin or they may be carried for rescreening to another of the picking and screening units.

I claim:

1. In a material handling assembly, a plurality of substantially horizontal conveyors placed directly above one another, the lower being an endless conveyor, a chute adapted to deliver material from the upper to the lower conveyor, a rescreening section for the upper strand of the lower conveyor positioned beyond the point of discharge of said chute.

2. In a material handling assembly, a plurality of substantially horizontal conveyors placed directly above one another, the lower being an endless conveyor, a chute adapted to deliver material from the upper to the lower conveyor, a rescreening section for the upper strand of the lower conveyor positioned beyond the point of discharge of said chute, and a rescreening section intermediate the ends of said chute.

3. In a material handling assembly, a plurality of conveyors placed directly above one another, the lower being an endless conveyor, a chute adapted to deliver material from the upper to the lower conveyor, a rescreening section for the upper strand of the lower conveyor positioned beyond the point of discharge of said chute, a rescreening section intermediate the ends of said chute, and a discharge element adapted to deliver material from the upper to the lower strand of the endless conveyor positioned on the opposite side of the chute end from the first mentioned rescreening element.

4. In a material handling assembly, a plurality of conveyors arranged directly above one another, the lower being an endless conveyor, a pivoted discharge chute connecting said conveyors, a rescreening element in said discharge chute, a second rescreening element for the upper strand of the endless conveyor, and a valve in the upper strand of said conveyor adapted to by-pass material which passes through and is received from the screening area of the discharge chute to the lower strand of the conveyor.

5. In a material handling assembly, a plurality of superposed endless conveyors, an inclined chute adapted to deliver material from the upper to the lower conveyor, a pivoted loading boom adapted to co-operate with the lower conveyor, and additional means independent of the upper conveyor adapted to supply material to the lower conveyor.

6. In a material handling assembly, a plurality of superposed endless conveyors, a pivoted inclined chute adapted to deliver material from the upper to the lower conveyor, a pivoted loading boom included within the circuit of the lower conveyor, and additional means independent of the upper conveyor adapted to supply material to the lower conveyor.

7. In a material handling assembly, a plurality of superposed endless conveyors, an inclined chute adapted to deliver material from the upper to the lower conveyor, a pivoted loading boom adapted to co-operate with the lower conveyor, screening means intermediate the ends of said chute adapted to deliver material to the upper strand of the lower conveyor at a point above the point of delivery of the chute, a valve adapted to deliver material from the upper to the lower strand of said conveyor intermediate said screen and said point of delivery, and means for delivering material from said lower strand at a point separate from the normal delivery of material from the upper strand.

8. In a material handling assembly, a plurality of superposed endless conveyors, a pivoted inclined chute adapted to deliver material from the upper to the lower conveyor, a pivoted loading boom included within the circuit of the lower conveyor, screening means intermediate the ends of said chute adapted to deliver material to the upper strand of the lower conveyor at a point above the point of delivery of the chute, a valve adapted to deliver material from the upper to the lower strand of said conveyor intermediate said screen and said point of delivery, and means for delivering material from said lower strand at a point separate from the normal delivery of material from the upper strand.

9. In a material handling assembly, a plurality of conveyors arranged directly above one another, the lower being an endless conveyor, a pivoted discharge chute connecting said conveyors, a rescreening element in said discharge chute, a second rescreening element for the upper strand of the endless conveyor, and a valve in the upper strand of said conveyor adapted to by-pass material from the screening area of the discharge chute to the lower strand of the conveyor, a material receiving pocket underlying said second screening element, a valve therein adapted to deliver material to the lower strand, and means for controlling said valve.

10. In a material handling assembly, a plurality of superposed conveyors, the lower of said conveyors being an endless conveyor, a discharge chute adapted to deliver material from the upper to the lower conveyor, a rescreening area in the upper strand of said lower conveyor, valves therebeneath adapted to deliver material to the lower strand of the conveyor, and means for closing said valves.

11. In a material handling assembly, a plurality of superposed conveyors, the lower of said conveyors being an endless conveyor, a discharge chute adapted to deliver material from the upper to the lower conveyor, a rescreening area in the upper strand of said lower conveyor, valves therebeneath adapted to deliver material to the lower strand of the conveyor, means for closing said valves, and an additional rescreening area intermediate the ends of said chute.

12. In a material handling assembly, a lower substantially horizontal endless conveyor, an upper substantially horizontal conveyor overlying it, an inclined discharge chute adapted to deliver material from the upper to the lower conveyor, a screening member intermediate the ends of said chute adapted to deliver screened material to said endless conveyor, and an additional independent conveying element adapted to deliver material to said conveyor at a separate point.

13. In a material handling assembly, a lower endless conveyor, an upper conveyor overlying it, an inclined discharge chute adapted to deliver material from the upper to the lower conveyor, a screening member intermediate the ends of said chute adapted to deliver screened material to said endless conveyor, and an additional independent conveying element adapted to deliver material to said conveyor at a separate point, the point of delivery of the chute being the nearest the discharge end of the conveyor and the independent conveyor being adapted to deliver material at a point farther removed from the discharge end of the conveyor.

14. In a material handling assembly comprising a primary screening element and means for supplying thereto the material to be screened, a plurality of secondary screening elements adapted to be supplied with different grades of material from the primary element, delivery means associated with the secondary screening means, and refuse discharge means comprising respectively a pivoted loading boom at the end of each secondary screening element and a refuse conveyor passing adjacent each secondary element and means for discharging material thereto.

15. In a material handling assembly comprising a primary screening element and means for supplying thereto the material to be screened, a plurality of secondary screening elements adapted to be supplied with different grades of material from the primary element, delivery means associated with the secondary screening means, and refuse discharge means, and means for delivering the screenings of one secondary element to another secondary element for rescreening, comprising an endless conveyor, one strand of which is above and one below the secondary elements, and means for discharging material from said elements to said conveyor and from said conveyor to said elements.

16. In a coal handling assembly, a loading boom comprising a substantially horizontal section, and an end section pivoted thereto, means for rotating the end section about a horizontal axis, an endless conveyor extending from end to end of the entire loading boom and surrounding both sections, means for feeding coal to the upper surface of the horizontal section, and a rescreening section intermediate the ends of said horizontal section.

17. In a coal handling assembly, a loading boom comprising a substantially horizontal section, and an end section pivoted thereto, means for rotating the end section about a horizontal axis, an endless conveyor extending from end to end of the entire loading boom and surrounding both sections, means for feeding coal to the upper surface of the horizontal section, and a rescreening section intermediate the ends of said horizontal section, said rescreening section adapted to deliver coal to the lower reach of said horizontal section.

18. In a material handling assembly, a plurality of superposed, substantially horizontal endless conveyors arranged one above the other in substantially parallel alignment, and adapted to convey material simultaneously in the same direction, the lower conveyor underlying, but projecting substantially beyond the end of the upper conveyor, and means for delivering material from the end of the upper conveyor to the lower conveyor, comprising a pivoted chute adjustable as to length and to angle, and a screening section intermediate the ends of said chute.

19. In a material handling assembly, a plurality of substantially horizontal endless conveyors arranged one above the other, means for delivering material from the upper conveyor to the lower conveyor comprising a chute pivoted adjacent one end of the upper conveyor, and means for adjusting the length and angle of the chute, and a screening element in said chute located intermediate its ends.

20. In a material handling assembly, a plurality of substantially horizontal conveyors, placed directly above one another, the lower of the two being an endless conveyor, a chute adapted to deliver material from the upper to the lower conveyor and means intermediate the end of said lower conveyor for delivering material from the upper to the lower strand of said conveyor.

Signed at Chicago county of Cook and State of Illinois, this 14th day of September 1922.

GEORGE S. JAXON.